United States Patent
Owens et al.

(10) Patent No.: US 12,241,274 B2
(45) Date of Patent: Mar. 4, 2025

(54) SKIMMER ASSEMBLY

(71) Applicant: Blue Square Manufacturing, LLC, Chandler, AZ (US)

(72) Inventors: Jeremy Owens, Mesa, AZ (US); David Spykerman, Chandler, AZ (US)

(73) Assignee: Blue Square Manufacturing, LLC, Chandler, AZ (US)

( * ) Notice: Subject to any disclaimer, the term of this patent is extended or adjusted under 35 U.S.C. 154(b) by 254 days.

(21) Appl. No.: 17/570,537

(22) Filed: Jan. 7, 2022

(65) Prior Publication Data
US 2023/0220695 A1    Jul. 13, 2023

(51) Int. Cl.
*E04H 4/12*    (2006.01)
*C02F 1/00*    (2023.01)
*C02F 1/40*    (2023.01)
*C02F 103/42*    (2006.01)

(52) U.S. Cl.
CPC .......... *E04H 4/1272* (2013.01); *C02F 1/001* (2013.01); *C02F 1/40* (2013.01); *C02F 2103/42* (2013.01); *C02F 2201/005* (2013.01); *C02F 2209/42* (2013.01)

(58) Field of Classification Search
None
See application file for complete search history.

(56) References Cited

U.S. PATENT DOCUMENTS

| | | | | |
|---|---|---|---|---|
| 1,800,378 | A | * | 4/1931 | Everson .................... E04H 4/12 210/123 |
| 2,701,235 | A | * | 2/1955 | King ........................ E04H 4/12 137/448 |
| 2,739,939 | A | * | 3/1956 | Leslie ...................... G05D 9/02 210/114 |
| 2,809,752 | A | * | 10/1957 | Leslie ...................... E04H 4/12 210/127 |
| 2,979,206 | A | * | 4/1961 | Konopka .............. E04H 4/1272 210/418 |
| 3,060,954 | A | * | 10/1962 | Froetschner ............. G05D 9/04 137/122 |
| 3,297,163 | A | * | 1/1967 | Landon .............. B01D 29/6446 210/167.14 |
| 3,386,107 | A | * | 6/1968 | Whitten, Jr. .......... E04H 4/1227 4/508 |

(Continued)

FOREIGN PATENT DOCUMENTS

AU    2014100682    7/2014

*Primary Examiner* — Robert J Popovics
(74) *Attorney, Agent, or Firm* — Miller Johnson

(57) ABSTRACT

A skimmer assembly includes a housing, a first inlet, a first outlet, a second inlet, a second outlet, and a valve. The housing includes a first chamber portion, a second chamber portion, and a divider wall. The divider wall is operable to inhibit fluid communication between the first chamber portion and the second chamber portion. The first inlet and the first outlet are in fluid communication with the first chamber portion. The second inlet and the second outlet are in fluid communication with the second chamber portion. The valve is operable in an open state and a closed state. The valve is configured to (i) allow a flow of fluid into the second chamber portion in the open state and (ii) inhibit the flow of fluid into the second chamber portion in the closed state.

20 Claims, 5 Drawing Sheets

(56) References Cited

U.S. PATENT DOCUMENTS

| | | | | |
|---|---|---|---|---|
| 3,532,217 A | * | 10/1970 | Richards | E04H 4/12 210/167.13 |
| 3,537,111 A | * | 11/1970 | Whitten, Jr. | E04H 4/12 4/508 |
| 3,739,405 A | * | 6/1973 | Schmidt | E04H 4/12 137/412 |
| 3,759,286 A | * | 9/1973 | Page | G05D 9/12 137/392 |
| 3,765,534 A | | 10/1973 | West et al. | |
| 3,837,015 A | * | 9/1974 | Whitaker | G05D 9/02 210/127 |
| 3,848,627 A | * | 11/1974 | Page | G01F 23/241 137/392 |
| 4,133,058 A | * | 1/1979 | Baker | E04H 4/1209 4/510 |
| 4,133,059 A | * | 1/1979 | Baker | E04H 4/1209 4/494 |
| 4,185,333 A | * | 1/1980 | Ortega | E04H 4/1209 137/433 |
| 4,206,522 A | * | 6/1980 | Baker | E04H 4/1227 4/512 |
| 4,342,125 A | * | 8/1982 | Hodge | E04H 4/12 137/430 |
| 4,373,220 A | * | 2/1983 | Selsted | E04H 4/1209 137/563 |
| 4,389,739 A | * | 6/1983 | Baker | E04H 4/1227 4/510 |
| 4,445,238 A | * | 5/1984 | Maxhimer | E04H 4/12 73/290 R |
| 4,454,035 A | * | 6/1984 | Stefan | E04H 4/1272 210/123 |
| 4,498,984 A | * | 2/1985 | Colson | E04H 4/12 4/508 |
| 4,592,098 A | * | 6/1986 | Magnes | E04H 4/12 4/496 |
| 4,607,399 A | * | 8/1986 | Yovanofski | E04H 4/12 137/429 |
| 4,686,718 A | * | 8/1987 | Kinkead | G05D 9/12 137/428 |
| 4,706,310 A | * | 11/1987 | Magnes | E04H 4/1272 137/400 |
| 4,724,552 A | * | 2/1988 | Kinkead | E04H 4/1209 4/508 |
| 4,725,352 A | * | 2/1988 | Haliotis | E04H 4/1272 137/625.3 |
| 4,853,986 A | * | 8/1989 | Allen | E04H 4/12 239/576 |
| 4,876,001 A | * | 10/1989 | Supra | E04H 4/1272 137/433 |
| 4,913,810 A | | 4/1990 | Hodak | |
| 4,972,530 A | * | 11/1990 | Synder | E04H 4/1209 4/496 |
| 5,367,723 A | * | 11/1994 | Pleva | E04H 4/12 4/507 |
| 5,406,657 A | * | 4/1995 | Donati | E03D 5/006 4/415 |
| 5,459,886 A | * | 10/1995 | Payne | E04H 4/1209 137/414 |
| 5,596,773 A | * | 1/1997 | Cueman | E04H 4/12 4/496 |
| 5,655,232 A | * | 8/1997 | Buckwalter | E04H 4/12 137/449 |
| 5,790,991 A | * | 8/1998 | Johnson | E04H 4/12 137/423 |
| 5,836,022 A | * | 11/1998 | Busenga | F16K 31/18 4/508 |
| 5,879,547 A | * | 3/1999 | Desjoyaux | B01D 35/26 210/195.1 |
| 6,000,425 A | * | 12/1999 | Steinorth | F16K 21/18 137/391 |
| 6,006,605 A | * | 12/1999 | Sulollari | E04H 4/12 73/306 |
| 6,223,359 B1 | * | 5/2001 | Oltmanns | E04H 4/12 137/392 |
| 7,003,817 B1 | * | 2/2006 | Pansini | E04H 4/12 137/426 |
| 7,144,501 B2 | * | 12/2006 | Beaulieu | A01K 63/04 210/167.01 |
| 7,451,500 B2 | | 11/2008 | Baker, Jr. et al. | |
| 7,485,220 B2 | * | 2/2009 | Kelty | E04H 4/1272 210/748.11 |
| 7,690,054 B1 | * | 4/2010 | Pansini | E04H 4/12 4/507 |
| 7,699,983 B2 | * | 4/2010 | Andrei | E04H 4/1272 210/232 |
| 7,914,009 B1 | | 3/2011 | Gerspach | |
| 7,934,517 B2 | * | 5/2011 | Morrison | E04H 4/12 137/428 |
| 8,091,581 B2 | * | 1/2012 | Buchtel | F16K 31/26 137/448 |
| 8,689,369 B2 | * | 4/2014 | Nelson | E04H 4/1281 210/167.17 |
| 8,875,731 B2 | * | 11/2014 | Larsen | E04H 4/12 137/434 |
| 9,428,929 B2 | * | 8/2016 | Prendergast | E04H 4/1272 |
| 9,513,638 B2 | * | 12/2016 | Reddy | B05B 17/08 |
| 10,161,151 B2 | | 12/2018 | Goettl et al. | |
| 10,676,947 B2 | * | 6/2020 | Pleva | F16K 1/221 |
| 10,835,846 B1 | | 11/2020 | Carpenter | |
| 11,015,359 B2 | * | 5/2021 | MacDonald | E04H 4/1218 |
| 11,137,087 B1 | * | 10/2021 | Goetz | F16K 31/265 |
| 11,524,252 B2 | * | 12/2022 | Aquilina | E04H 4/1272 |
| 11,976,490 B2 | * | 5/2024 | Owens | E04H 4/1272 |
| 12,076,667 B2 | * | 9/2024 | Renken | E04H 4/1272 |
| 2004/0205885 A1 | * | 10/2004 | Gardner | E04H 4/12 4/507 |
| 2006/0070174 A1 | * | 4/2006 | Pansini | E04H 4/12 4/507 |
| 2007/0089505 A1 | * | 4/2007 | Peterson | G05D 9/02 73/313 |
| 2008/0073257 A1 | * | 3/2008 | Foley | E04H 4/1272 210/167.13 |
| 2009/0151796 A1 | * | 6/2009 | Buchtel | F16K 31/26 137/434 |
| 2009/0159516 A1 | * | 6/2009 | Andrei | E04H 4/1272 210/167.12 |
| 2009/0165202 A1 | * | 7/2009 | Morrison | E04H 4/12 4/508 |
| 2010/0071123 A1 | * | 3/2010 | Larsen | E04H 4/12 137/15.01 |
| 2010/0125942 A1 | * | 5/2010 | Nelson | E04H 4/1272 4/490 |
| 2011/0284440 A1 | * | 11/2011 | De Souza Sisson | C02F 1/001 210/167.12 |
| 2015/0227145 A1 | * | 8/2015 | Reddy | G05D 9/12 137/391 |
| 2016/0305143 A1 | * | 10/2016 | Hatlen | E04H 4/1272 |
| 2017/0147013 A1 | * | 5/2017 | Reddy | B05B 17/08 |
| 2017/0184233 A1 | | 6/2017 | Beagen, Jr. | |
| 2019/0331252 A1 | * | 10/2019 | Jensen | G05D 9/12 |
| 2020/0018084 A1 | * | 1/2020 | Pleva | E04H 4/1209 |
| 2021/0131132 A1 | | 5/2021 | Blanc Tailleur et al. | |
| 2023/0220693 A1 | * | 7/2023 | Owens | C02F 1/40 210/167.1 |
| 2023/0220694 A1 | * | 7/2023 | Spykerman | E04H 4/1272 210/167.19 |
| 2023/0220695 A1 | * | 7/2023 | Owens | E04H 4/1272 222/1 |

* cited by examiner

SKIMMER ASSEMBLY

TECHNICAL FIELD

This disclosure relates generally to a skimmer assembly, and more particularly to a skimmer assembly including a plurality of chambers for use with a swimming pool.

BACKGROUND

This section provides background information related to the present disclosure and is not necessarily prior art. Conventional swimming pools usually include a skimmer assembly for allowing movement of water from the pool into the skimmer assembly. The skimmer assembly often includes an inlet to a filtration system that is powered by an in-line filter pump. Most skimmer assemblies also include a basket to capture leaves, sticks, and other debris as water moves from the pool into the skimmer assembly, and prior to it moving into the filtration system. Conventional swimming pools may also include a mechanism or system for filling the pool with water. The filling system may include an outlet for transferring water from a source to the pool, and a valve for terminating the flow of water from the source to the pool when the level of water in the pool reaches a predetermined value.

While known skimmer assemblies and filling systems have proven acceptable for their intended purposes, there remains a continuous need for improvement in the relevant art.

SUMMARY

This section provides a general summary of the disclosure, and is not a comprehensive disclosure of its full scope or all of its features.

One aspect of the disclosure provides a skimmer assembly. The skimmer assembly includes a housing, a first inlet, a first outlet, a second inlet, a second outlet, and a valve. The housing includes a first chamber portion, a second chamber portion, and a divider wall. The divider wall is operable to inhibit fluid communication between the first chamber portion and the second chamber portion. The first inlet and the first outlet are in fluid communication with the first chamber portion. The second inlet and the second outlet are in fluid communication with the second chamber portion. The valve is operable in an open state and a closed state. The valve is configured to (i) allow a flow of fluid into the second chamber portion in the open state and (ii) inhibit the flow of fluid into the second chamber portion in the closed state.

Implementations of the disclosure may include one or more of the following optional features. In some implementations, the skimmer assembly includes a third outlet in fluid communication with the second chamber portion. The housing may includes a base wall coupled to the divider wall. The divider wall may define a first height relative to the base wall. The third outlet may define a second height relative to the base wall. In some implementations, the second height is less than the first height.

In some implementations, the skimmer assembly includes a basket assembly disposed in the second chamber portion.

In some implementations, the skimmer assembly includes a cover coupled to the housing. The cover may be configured to inhibit access to the first chamber portion and the second chamber portion.

In some implementations, the housing includes a first sidewall, a second sidewall, a third sidewall, and a fourth sidewall. The second sidewall and the third sidewall may collectively define a recess relative to the first sidewall and the second sidewall. The second inlet may be disposed in the second sidewall. The skimmer assembly may further include a third outlet in fluid communication with the second chamber portion. The third outlet may be disposed in the second sidewall.

In some implementations, the housing includes a lower wall, a base wall, a first sidewall and a second sidewall. The base wall may be disposed parallel to the lower wall. The first sidewall may be disposed parallel to the second sidewall. The first outlet may be disposed in the lower wall. The first inlet may be disposed in the first sidewall. The second outlet may be disposed in the base wall. The second inlet may be disposed in the second sidewall.

In some implementations, the skimmer assembly includes at least one of a sensor or a float operable to determine a height of a fluid in the second chamber portion. The at least one of the sensor or the float may be in communication with the valve.

Another aspect of the disclosure provides a method of a method of operating a skimmer assembly. The skimmer assembly includes a first chamber portion, a second chamber portion, a divider wall and a valve. The divider wall separates the first chamber portion from the second chamber portion. The method includes dispensing a first amount of fluid to the first chamber portion through a first inlet. The method also includes dispensing at least a portion of the first amount of fluid from the first chamber portion through a first outlet. The method further includes dispensing a second amount of fluid to the second chamber portion through a second inlet. Additionally, the method includes dispensing at least a portion of the second amount of fluid from the second chamber portion through a second outlet. The method also includes inhibiting a flow of the first amount of fluid from the first chamber portion to the second chamber portion. The method further includes inhibiting a flow of the second amount of fluid from the second chamber portion to the first chamber portion. The method additionally includes operating the valve to inhibit a flow of the second amount of fluid to the second chamber portion through the second inlet.

This aspect may include one or more of the following optional features. In some implementations, the method includes operating the valve to allow the flow of the second amount of fluid to the second chamber portion through the second inlet.

In some implementations, the method includes dispensing at least a portion of the second amount of fluid from the second chamber portion through a third outlet.

In some implementations, inhibiting the flow of the first amount of fluid from the first chamber portion to the second chamber portion includes separating the first chamber portion from the second chamber portion with a divider wall.

In some implementations, the method includes determining a height of a fluid in the second chamber portion. Operating the valve to inhibit the flow of the second amount of fluid to the second chamber portion through the second inlet may include operating the valve to inhibit the flow of the second amount of fluid to the second chamber portion through the second inlet based on the determined height of the fluid in the second chamber portion.

The details of one or more implementations of the disclosure are set forth in the accompanying drawings and the description below. Other aspects, features, and advantages will be apparent from the description and drawings, and from the claims.

DESCRIPTION OF DRAWINGS

The drawings described herein are for illustrative purposes only of selected configurations and not all possible implementations, and are not intended to limit the scope of the present disclosure.

Like reference symbols in the various drawings indicate like elements.

DETAILED DESCRIPTION

Figure 1:
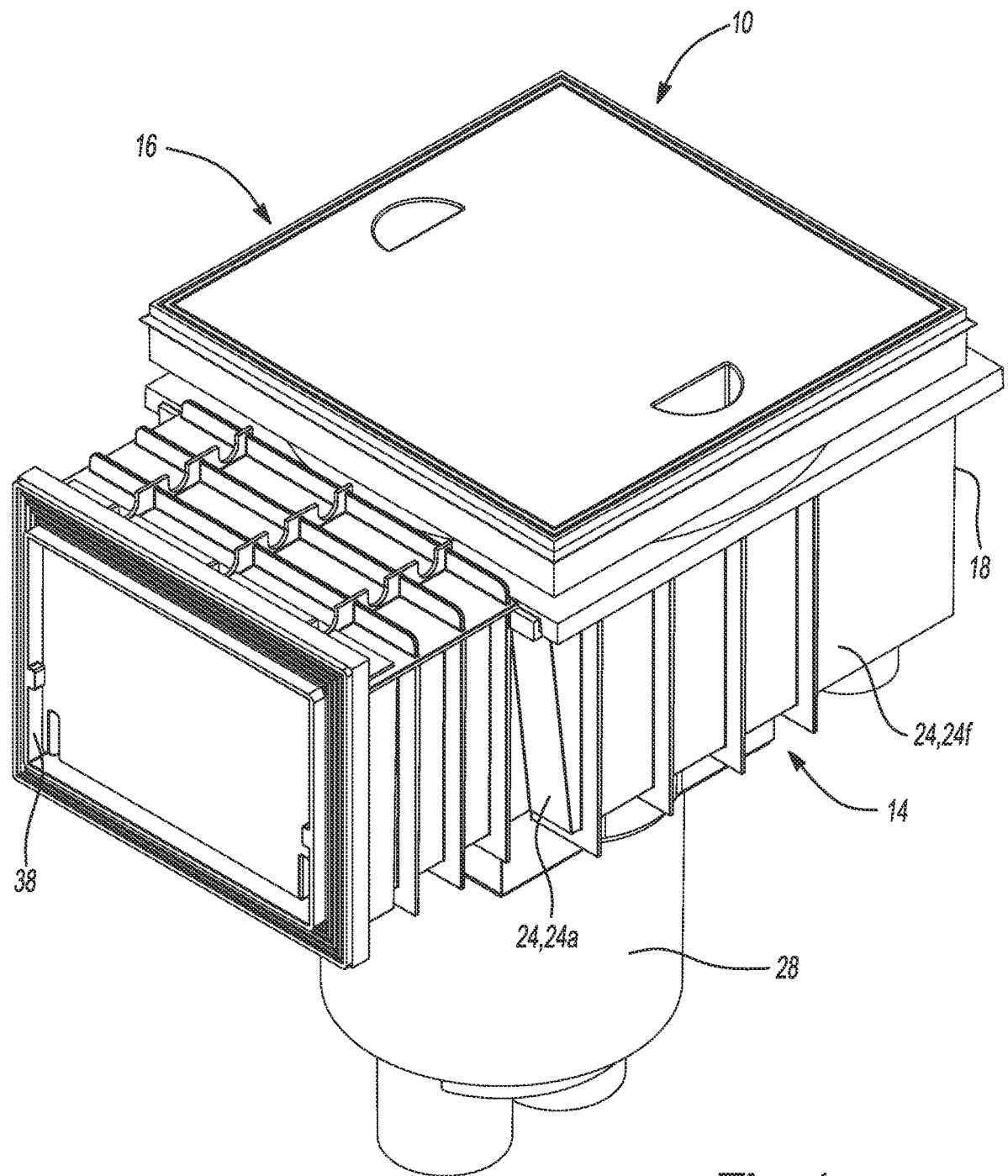
FIG. 1 is a top perspective view of a skimmer assembly in accordance with the principles of the present disclosure.
Figure 2:
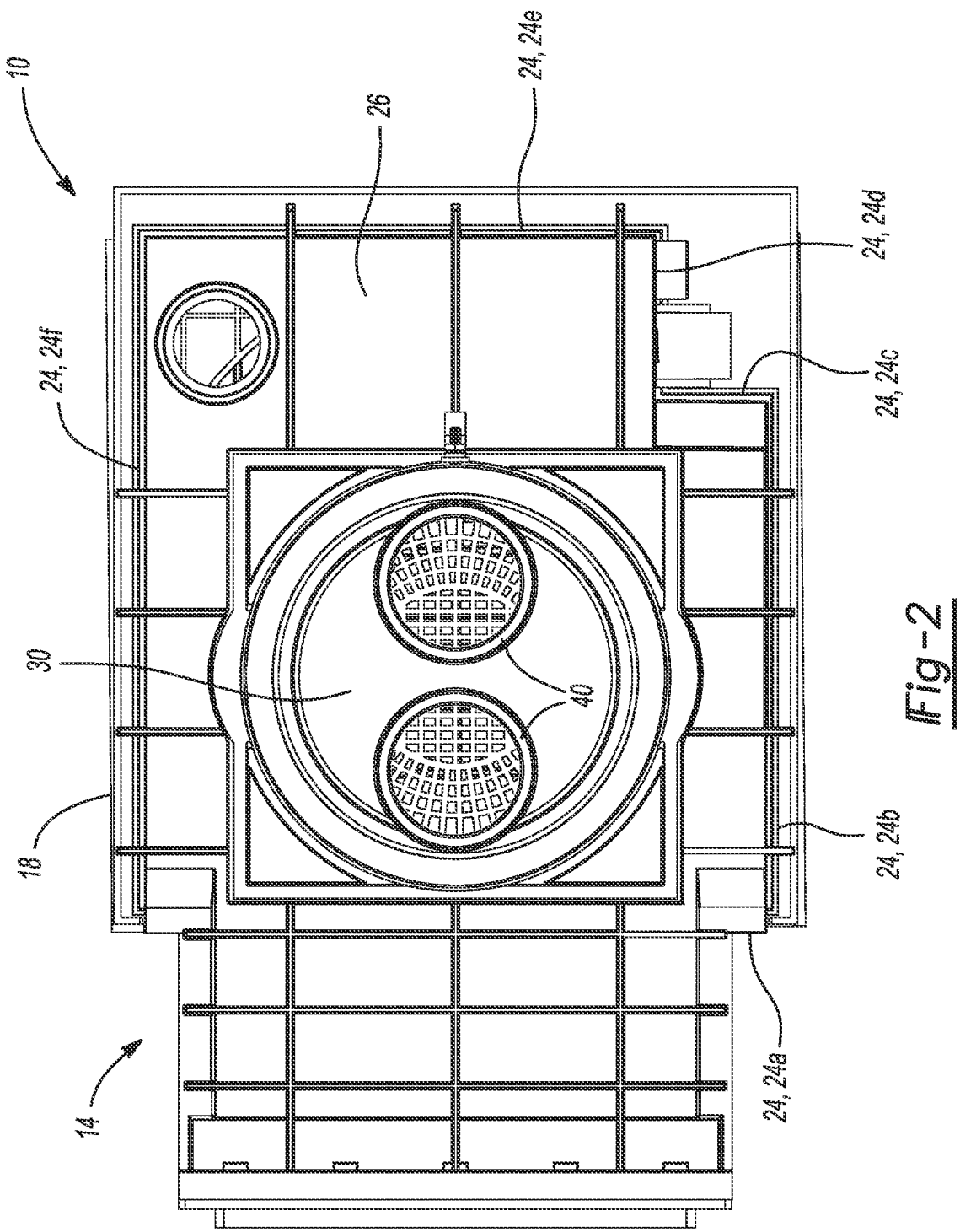
FIG. 2 is a bottom view of the skimmer assembly of FIG. 1.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Referring to FIG. 1, a skimmer assembly 10 is shown. As will be explained in more detail below, the skimmer assembly 10 may be utilized with, or assembled with, a swimming pool construct (not shown) in order to perform various functions relative to the water in the pool construct. For example, as will be described in more detail below, the skimmer assembly 10 maybe used to fill, chlorinate, remove debris, or perform other maintenance-related functions relative to the water in the pool construct.

The skimmer assembly 10 may include a housing assembly 14 and a cover assembly 16. In an assembled configuration, the cover assembly 16 may be coupled to the housing assembly 14, such that removing the cover assembly 16 from the housing assembly 14 allows a user to access various components within the housing assembly 14. A further discussion of the cover assembly 16, including various configurations and functions thereof, is found in commonly-owned U.S. patent application Ser. No. 17/570,506, the entire contents of which are incorporated by reference.

Figure 4:
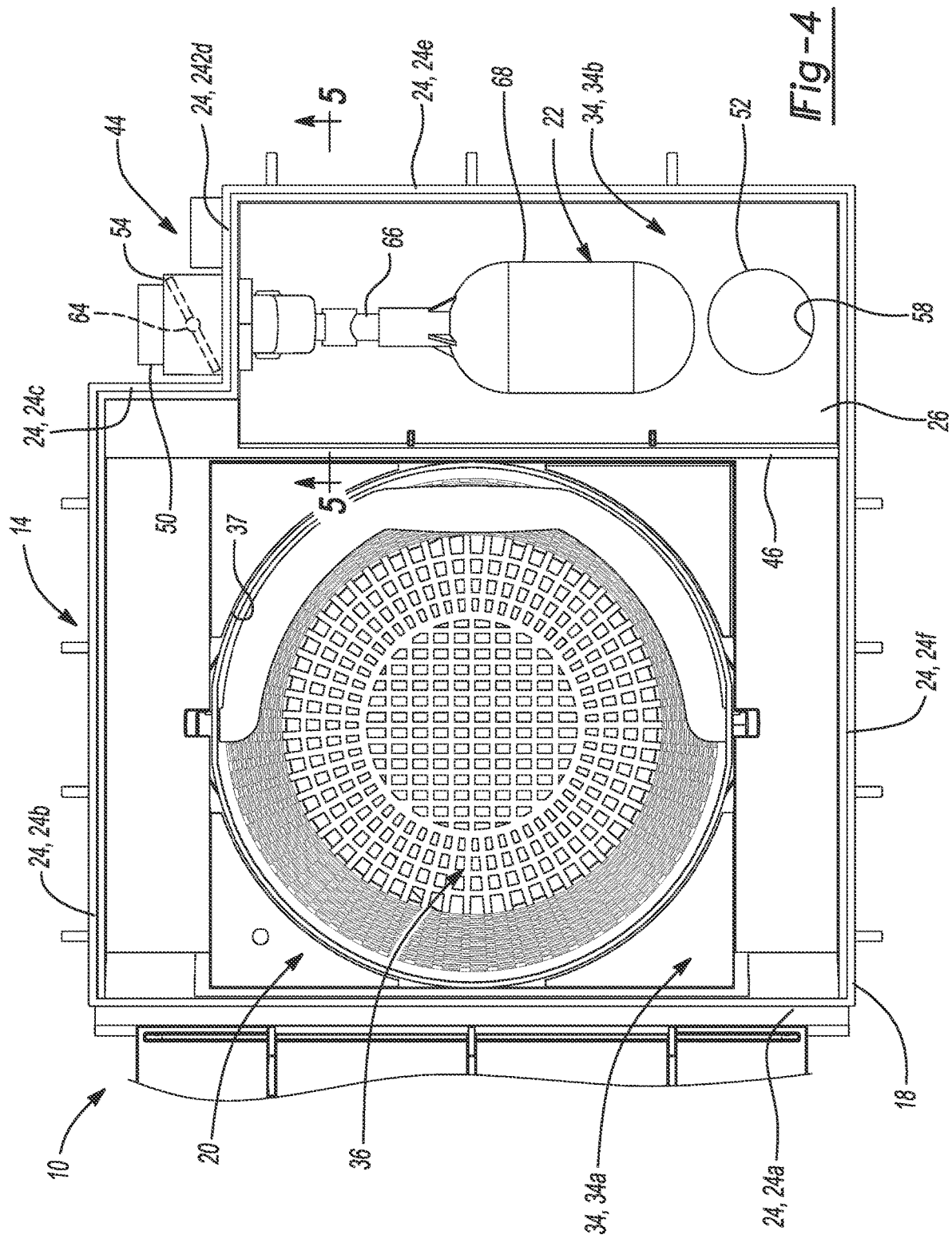
FIG. 4 is a top view of a portion of the skimmer assembly of FIG. 1 with a cover assembly of the skimmer assembly removed for clarity.

As illustrated in FIG. 4, the housing assembly 14 may include a housing 18, a basket assembly 20, and a valve system 22. The housing 18 may include one or more upper sidewalls 24, a base wall 26, one or more lower sidewalls 28, and a lower wall 30. The upper sidewalls 24 and the base wall 26 may collectively define at least a portion of an upper chamber 34. The lower sidewalls 28 and the lower wall 30 may collectively define at least a portion of a lower chamber 36 in fluid communication with the upper chamber 34.

The base wall 26 may define an opening 37 in fluid communication with the upper and lower chambers 34, 36. In some implementations, the opening 37 defines a substantially circular shape. The lower wall 30 may define one or more outlets 40 in fluid communication with the chambers 34, 36 and a filtration system (not shown) of the pool construct. In this regard, during operation of the skimmer assembly 10, water may flow from the pool to the chambers 34, 36 through an inlet 38 (FIG. 1) of the housing assembly 14, and, thereafter, to the filtration system prior to flowing back into the pool.

In the assembled configuration, the basket assembly 20 may be disposed at least partially within the upper and/or lower chambers 34, 36 such that water flows through the inlet 38 from the pool and through the basket assembly 20 prior to entering the filtration system through the outlet(s) 40. In this way, the basket assembly 20 can remove debris from the water flowing from the pool to the outlet(s) 40 prior to the water entering the filtration system. A further discussion of the basket assembly 20, including various configurations and functions thereof, is found in commonly-owned U.S. patent application Ser. No. 17/570,518, the entire contents of which are incorporated by reference.

The upper sidewalls 24 may include a first sidewall 24a, a second sidewall 24b, a third sidewall 24c, a fourth sidewall 24d, a fifth sidewall 24e, and a sixth sidewall 24f. The second sidewall 24b may extend from the first sidewall 24a to the third sidewall 24c. The fourth sidewall 24d may extend from the third sidewall 24c to the fifth sidewall 24e. The sixth sidewall 24f may extend from the fifth sidewall 24e to the first sidewall 24a. In some implementations, the first, second, fifth, and sixth sidewalls 24a, 24b, 24e, 24f define a portion of a rectangular shape relative to a top view (e.g., FIG. 4) of the housing 18.

The third sidewall 24c and the second sidewall 24b may define a substantially (e.g., +/−forty-five degrees) orthogonal angle therebetween. Similarly, the third sidewall 24c and the fourth sidewall 24d may define a substantially (e.g., +/−forty-five degrees) orthogonal angle therebetween, the fifth sidewall 24e and the fourth sidewall 24d may define a substantially (e.g., +/−forty-five degrees) orthogonal angle therebetween, and the second sidewall 24b and the fifth sidewall 24e may define a substantially (e.g., +/−forty-five degrees) orthogonal angle therebetween. In this regard, as illustrated in FIG. 4, the third and fourth sidewalls 24c, 24d may define a recess 44 relative to the second and fifth sidewalls 24b, 24e.

Figure 5:
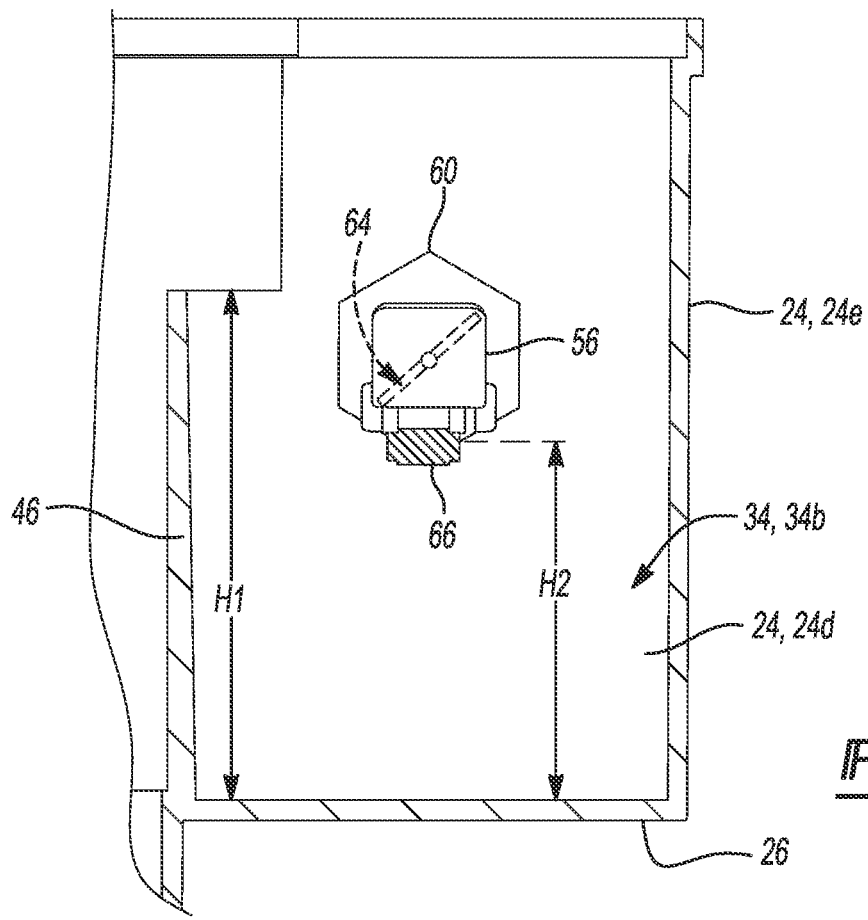
FIG. 5 is a cross-sectional view of a portion of the skimmer assembly of FIG. 1 taken through the line 5-5 of FIG. 4.
Figure 6:
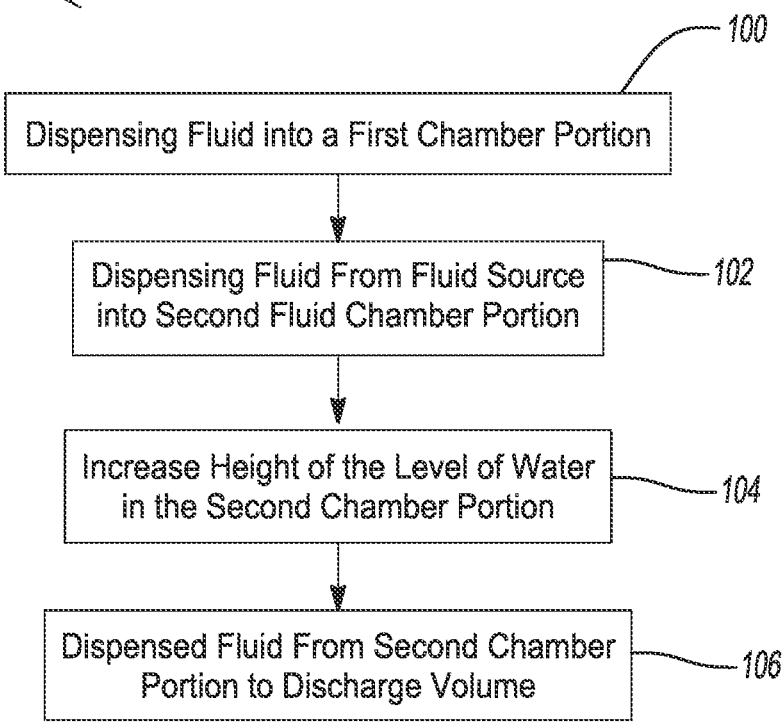
FIG. 6 is a flow diagram of a method of operating a skimmer assembly in accordance with the principles of the present disclosure.

The housing 18 may further include a divider wall 46. The divider wall 46 may extend from the base wall 26 between at least two of the upper sidewalls 24. In particular, as illustrated in FIG. 5, the divider wall 46 may define a height H1 extending from the base wall 26. For example, as illustrated in FIG. 4, in some implementations, the divider wall 46 extends from the sixth sidewall 24f to the second sidewall 24b, the third sidewall 24c, and/or the fourth sidewall 24d. In this regard, the divider wall 46 may divide the upper chamber 34 into a first chamber portion 34a and a second chamber portion 34b, thereby preventing fluid communication between the chamber portions 34a, 34b along the base wall 26.

Figure 3:
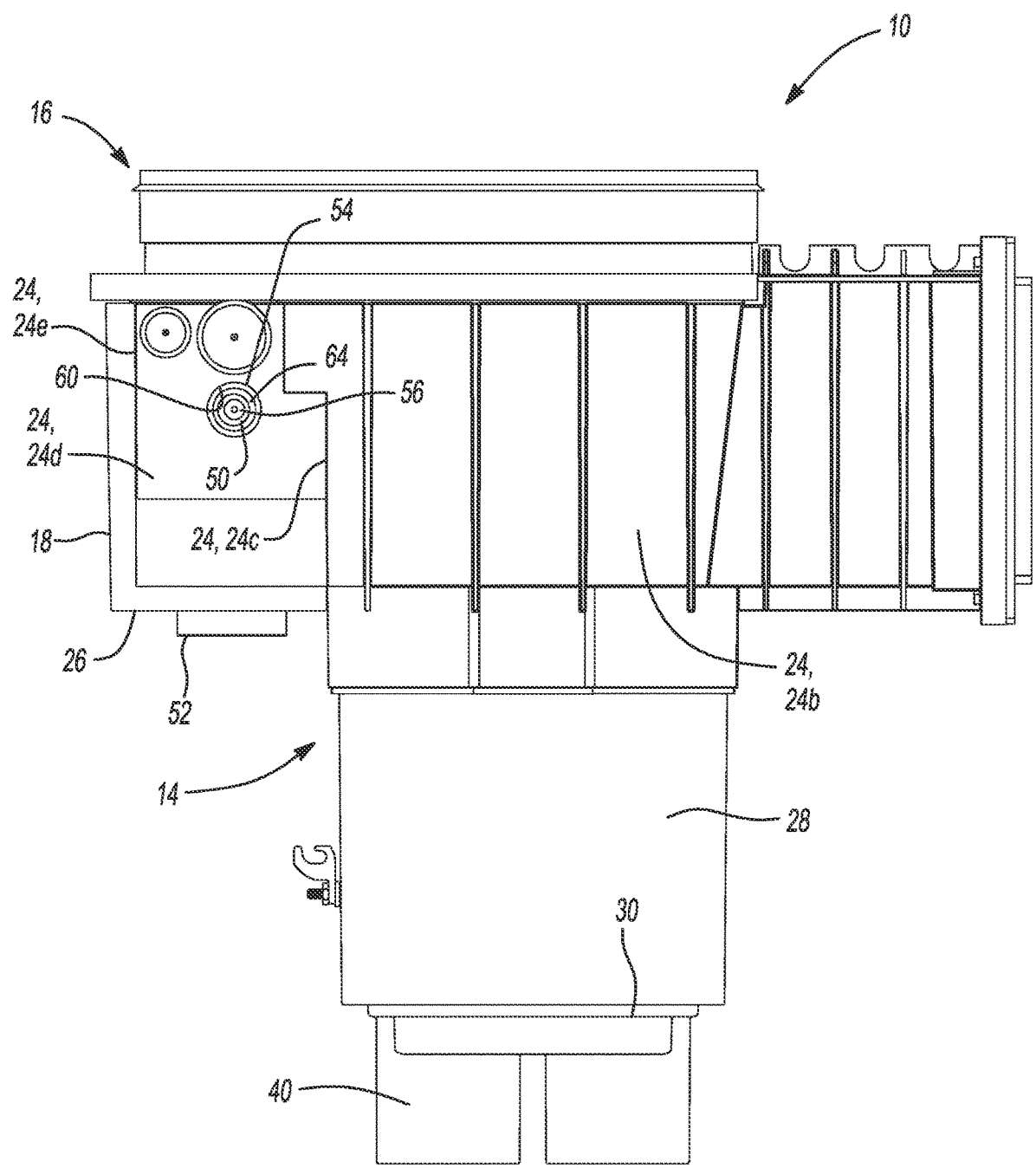
FIG. 3 is a side view of the skimmer assembly of FIG. 1.

The housing 18 may further define and/or include a fill inlet 50, a fill outlet 52, and an overflow outlet 54. With reference to FIGS. 3 and 4, the fill inlet 50 may define an aperture 56 providing fluid communication between the second chamber portion 34b and a fluid source (e.g., a tank, a well, a municipal water supply, etc.). In some implementations, the fill inlet 50 is formed in the fourth sidewall 24d.

The fill outlet 52 may define an aperture 58 providing fluid communication between the second chamber portion 34b and the pool. In some implementations, the fill outlet 52 is formed in the base wall 26.

The overflow outlet 54 may define an aperture 60 providing fluid communication between the second chamber portion 34b and a fluid discharge volume (not shown). In some implementations, the overflow outlet 54 is formed in the fourth sidewall 24d. In this regard, the overflow outlet 54 may be disposed at a height H2 extending from the base wall 26. The height H2 may be less than the height H1 such that a volume of fluid in the second chamber portion 34b may flow through the overflow outlet 54 prior to flowing from the second chamber portion 34b to the first chamber portion 34a, as will be described in more detail below.

The valve system 22 may include a valve 64 to control fluid communication between the fluid source and the second chamber portion 34b through the fill inlet 50. In this regard, in an open state, the valve 64 may allow fluid communication between the fluid source and the second chamber portion 34b through the fill inlet 50, while in a closed state, the valve 64 may inhibit (e.g., prevent) fluid communication between the fluid source and the second chamber portion 34b through the fill inlet 50. In some implementations, the valve 64 is a ballcock (e.g., float) valve. Accordingly, the valve system 22 may include an arm 66 and a floating mechanism 68 disposed proximate an end of the arm 66 such that, as the height of the water in the second chamber portion 34b increases, the floating mechanism 68 rises and causes the valve 64 to move from the open position to the closed position, thereby inhibiting the flow of water through the fill inlet 50 from the water source. It will be appreciated that the valve system 22 may include other types of flow control valves (e.g., flapper valve, gate valve, diaphragm valve, etc.) within the scope of the present disclosure. In this regard, while the valve 64 is generally shown and described herein as being controlled by the floating mechanism 68, it will be appreciated that the valve 64 may be controlled by other mechanisms (e.g., electronics, sensors, etc.) within the scope of the present disclosure.

A method of operating the skimmer assembly 10 will now be described with reference to FIGS. 1-6. In a step 100 of operating the skimmer assembly 10, fluid (e.g., water) may be dispensed (e.g., flow) from the pool into the first chamber portion 34a through the inlet 38. At step 100, the water in the first chamber portion 34a may also be dispensed (e.g., flow) through the outlet(s) 40 and into the filtration system, while the divider wall 46 may prevent the water from flowing into the second chamber portion 34b from the first chamber portion 34a.

In a second step 102 of operating the skimmer assembly 10, fluid (e.g., water) may be dispensed (e.g., flow) from the fluid source into the second chamber portion 34a through the inlet 50. At step 102, the water may also be dispensed (e.g., flow) from the second chamber portion 34b into the pool through the fill outlet 52, while the divider wall 46 may prevent the water from flowing into the first chamber portion 34a from the second chamber portion 34b.

In a third step 104 of operating the skimmer assembly 10, the height of the level of water in the second chamber portion 34b may increase. For example, the height of the level of water in the second chamber portion 34b may increase at step 104 until it causes (e.g., by causing the floating mechanism 68 to float to a predetermined height) the valve 64 to move from the open position to the closed position. In some implementations, a fourth step 106 of operating the skimmer assembly 10 may include increasing the height of the level of water to the height H2 such that water is dispensed (e.g., flows) from the second chamber portion 34b to the discharge volume through the overflow outlet 54. In some implementations, the first, second, third, and/or fourth steps 100, 102, 104, 106 occur concurrently during the method of operating the skimmer assembly 10.

The following Clauses provide an exemplary configuration for a skimmer assembly and related methods, as described above.

Clause 1: A skimmer assembly comprising: a housing including a first chamber portion, a second chamber portion, and a divider wall operable to inhibit fluid communication between the first chamber portion and the second chamber portion; a first inlet in fluid communication with the first chamber portion; a first outlet in fluid communication with the first chamber portion; a second inlet in fluid communication with the second chamber portion; a second outlet in fluid communication with the second chamber portion; and a valve operable in an open state and a closed state, wherein the valve is configured to (i) allow a flow of fluid into the second chamber portion in the open state and (ii) inhibit the flow of fluid into the second chamber portion in the closed state.

Clause 2: The skimmer assembly of clause 1, further comprising a third outlet in fluid communication with the second chamber portion.

Clause 3: The skimmer assembly of clause 2, wherein the housing includes a base wall coupled to the divider wall, and wherein the divider wall defines a first height relative to the base wall, and the third outlet defines a second height relative to the base wall.

Clause 4: The skimmer assembly of clause 3, wherein the second height is less than the first height.

Clause 5: The skimmer assembly of any of clauses 1 through 4, further comprising a basket assembly disposed in the second chamber portion.

Clause 6: The skimmer assembly of any of clauses 1 through 5, further comprising a cover coupled to the housing and configured to inhibit access to the first chamber portion and the second chamber portion.

Clause 7: The skimmer assembly of any of clauses 1 through 6, wherein the housing includes a first sidewall, a second sidewall, a third sidewall, and a fourth sidewall, and wherein the second sidewall and the third sidewall collectively define a recess relative to the first sidewall and the second sidewall.

Clause 8: The skimmer assembly of clause 7, wherein the second inlet is disposed in the second sidewall.

Clause 9: The skimmer assembly of any of clauses 7 through 8, further comprising a third outlet in fluid communication with the second chamber portion, wherein the third outlet is disposed in the second sidewall.

Clause 10: The skimmer assembly of any of clauses 1 through 9, wherein the housing includes a lower wall, a base wall, a first sidewall and a second sidewall, the base wall disposed parallel to the lower wall, the first sidewall disposed parallel to the second sidewall, and wherein the first outlet is disposed in the lower wall, the first inlet is disposed in the first sidewall, the second outlet is disposed in the base wall, and the second inlet is disposed in the second sidewall.

Clause 11: The skimmer assembly of any of clauses 1 through 10, further comprising at least one of a sensor or a float operable to determine a height of a fluid in the second chamber portion.

Clause 12: The skimmer assembly of clause 11, wherein the at least one of the sensor or the float is in communication with the valve.

Clause 13: A method of operating a skimmer assembly including a first chamber portion, a second chamber portion, a divider wall separating the first chamber portion from the second chamber portion, and a valve, the method comprising: dispensing a first amount of fluid to the first chamber portion through a first inlet; dispensing at least a portion of the first amount of fluid from the first chamber portion through a first outlet; dispensing a second amount of fluid to the second chamber portion through a second inlet; dispensing at least a portion of the second amount of fluid from the second chamber portion through a second outlet; inhibiting a flow of the first amount of fluid from the first chamber portion to the second chamber portion; inhibiting a flow of the second amount of fluid from the second chamber portion to the first chamber portion; and operating the valve to inhibit a flow of the second amount of fluid to the second chamber portion through the second inlet.

Clause 14: The method of clause 13, further comprising operating the valve to allow the flow of the second amount of fluid to the second chamber portion through the second inlet.

Clause 15: The method of any of clauses 13 through 14, further comprising dispensing at least a portion of the second amount of fluid from the second chamber portion through a third outlet.

Clause 16: The method of any of clauses 13 through 15, wherein inhibiting the flow of the first amount of fluid from the first chamber portion to the second chamber portion includes separating the first chamber portion from the second chamber portion with a divider wall.

Clause 17: The method of any of clauses 13 through 16, further comprising determining a height of a fluid in the second chamber portion.

Clause 18: The method of clause 17, wherein operating the valve to inhibit the flow of the second amount of fluid to the second chamber portion through the second inlet includes operating the valve to inhibit the flow of the second amount of fluid to the second chamber portion through the second inlet based on the determined height of the fluid in the second chamber portion.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A skimmer assembly comprising:
    a housing including a first chamber portion, a second chamber portion, and a divider wall operable to inhibit fluid communication between the first chamber portion and the second chamber portion;
    an inlet in fluid communication with the first chamber portion;
    an outlet in fluid communication with the first chamber portion;
    a fill inlet in fluid communication with the second chamber portion;
    a fill outlet in fluid communication with the second chamber portion; and
    a valve operable in an open state and a closed state, wherein the valve:
    (i) allows a flow of fluid through the fill inlet into the second chamber portion in the open state, and
    (ii) inhibits the flow of fluid through the fill inlet into the second chamber portion in the closed state.

2. The skimmer assembly of claim 1, further comprising an overflow outlet in fluid communication with the second chamber portion.

3. The skimmer assembly of claim 2, wherein the housing includes a base wall coupled to the divider wall, and wherein the divider wall defines a first height relative to the base wall, and the overflow outlet defines a second height relative to the base wall.

4. The skimmer assembly of claim 3, wherein the second height is less than the first height.

5. The skimmer assembly of claim 1, further comprising a basket assembly disposed in the second chamber portion.

6. The skimmer assembly of claim 1, further comprising a cover coupled to the housing and configured to inhibit access to the first chamber portion and the second chamber portion.

7. The skimmer assembly of claim 1, wherein the housing includes a first sidewall, a second sidewall, a third sidewall, and a fourth sidewall, and wherein the second sidewall and the third sidewall collectively define a recess relative to the first sidewall and the second sidewall.

8. The skimmer assembly of claim 7, wherein the fill inlet is disposed in the second sidewall.

9. The skimmer assembly of claim 7, further comprising a third outlet in fluid communication with the second chamber portion, wherein the third outlet is disposed in the second sidewall.

10. The skimmer assembly of claim 1, wherein the housing includes a lower wall, a base wall, a first sidewall and a second sidewall, the base wall disposed parallel to the lower wall, the first sidewall disposed parallel to the second sidewall, and wherein the outlet is disposed in the lower wall, the inlet is disposed in the first sidewall, the fill outlet is disposed in the base wall, and the fill inlet is disposed in the second sidewall.

11. The skimmer assembly of claim 1, further comprising at least one of a sensor or a float operable to determine a height of a fluid in the second chamber portion.

12. The skimmer assembly of claim 11, further comprising the float, wherein the float is in communication with the valve.

13. The skimmer assembly of claim 12, wherein:
the valve includes an arm, and
the float is disposed proximate an end of the arm.

14. The skimmer assembly of claim 13, wherein the float is configured to move as the height of the fluid in the second chamber portion increases.

15. The skimmer assembly of claim 14, wherein movement of the float is operable to move the valve from the open state to the closed state.

16. The skimmer assembly of claim 11, further comprising the sensor.

17. The skimmer assembly of claim 16, wherein the sensor is in communication with the valve.

18. The skimmer assembly of claim 1, wherein the valve is a ballcock valve.

19. The skimmer assembly of claim 1, wherein the valve is a flapper valve.

20. The skimmer assembly of claim 1, wherein the valve is a gate valve.

* * * * *